United States Patent Office 3,297,449
Patented Jan. 10, 1967

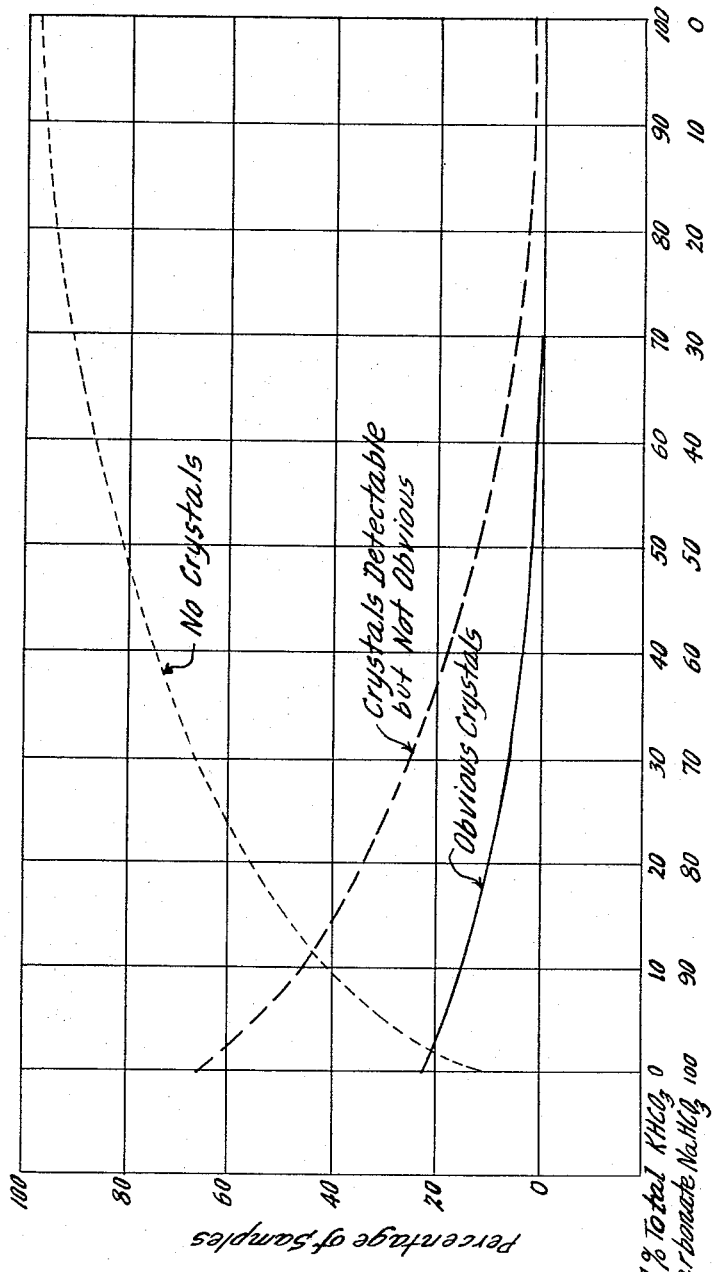

3,297,449
PACKAGED PRELEAVENED DOUGH CONTAINING SODIUM ACID PYROPHOSPHATE, AND SODIUM AND POTASSIUM BICARBONATE
Joseph S. Baker, Green Township, Hamilton County, Ohio, and Charles G. Lindeman, Westfield, N.J., assignors to The Procter & Gamble Company, Cincinnati, Ohio, a corporation of Ohio
Filed Nov. 13, 1963, Ser. No. 323,478
1 Claim. (Cl. 99—90)

The present invention relates to an improved leavening system for packaged dough compositions, especially those kept under refrigeration prior to use.

The food industry in recent years has made great strides in simplifying the task of the homemaker in preparing meals by supplying a variety of bakery goods in condition for immediate baking. A reasonably long storage life, say at least about eight weeks, is obviously an essential requirement for all such goods to afford time for distribution through normal commercial channels and for possible delays before sale. This requirement, however, creates special problems in the case of preleavened packaged dough compositions, such as those for biscuits, rolls, buns and like articles, an important segment of this field, which articles inherently contain a considerable amount of moisture. One particular problem is the provision of a suitable leavening system characterized by a rate of reaction sufficiently retarded to allow for handling and packaging but sufficiently rapid to insure early expansion of the dough in the package, as is normally needed for good sealing to exclude contaminents, coupled with adequate compatibility with the dough ingredients.

Typically, a leavening system is composed of one or more leavening acids and an alkaline substance capable of releasing carbon dioxide upon reaction with the leavening acid. A number of leavening acids are known in the baking art generally. One of the newer agents in this category, sodium acid pyrophosphate (occasionally referred to hereinafter as SAPP), has been found to be especially well suited to the needs of the preleavened packaged dough compositions, as explained above, and is widely used for this purpose at the present time. The only gas-producing agent now in practical use is sodium bicarbonate, i.e. baking soda. Insofar as leavening of the product alone is concerned, the system of sodium acid pyrophosphate and baking soda is eminently satisfactory. Its use, however, is attended by a highly variable phenomenon, the elimination of which is the basic object of this invention.

All chemical leavening agents for doughs progressively dissolve in the moisture content of the dough and react in the aqueous phase, assuming conditions are otherwise right. This is true of the combination of agents in question which normally react to form relatively basic sodium phosphate compounds, carbon dioxide and water. Given the long storage period and substantial water content of pre-leavened packaged dough compositions, these agents are sometimes subject to a reaction to form disodium orthophosphate dodecahydrate ($Na_2HPO_4 \cdot 12H_2O$). This reaction product may deposit in the form of glassy monoclinic crystals, ranging in the size from tiny grits to obvious particles of one-eighth inch or larger, both within the dough mass and on its surface. Because of their close resemblance to broken glass, these crystals are understandably objectionable to many housewives and are the source of many complaints, although they are, in fact, harmless, disappearing completely during baking. Unfortunately, the fears of the housewife cannot be entirely allayed by an explanatory note on the package.

The precise combination of conditions or other factors resulting in this phenomenon has so far proved impossible to identify despite vigorous efforts by both chemical suppliers and food manufacturers. For example, leading marketers of SAPP have studied the problem with little success other than to define its nature and offer general suggestions of little practical value. Furthermore, during the course of investigations which culminated in this invention, variations in numerous factors including non-homogeneous distribution, particle size, moisture content, pH, dough development, additives, grade of flour, and storage temperatures, were all examined and eliminated as direct contributors to this problem.

In the limited patented art concerned with this problem, attention has been directed toward more exotic solutions. Thus, according to U.S. Patent 2,942,988 to Erekson et al., issued June 28, 1960, the addition of fumaric acid to packaged refrigerated biscuit dough preleavened with baking soda and sodium acid pyrophosphate avoids the formation of phosphate crystals. However, in practice, the rate of reaction of the fumaric acid presents certain difficulties that are not readily controllable.

It has long been known that potassium compounds are, in general, more soluble than their sodium counterparts. However, this generalization does not always hold true in particular cases, especially as to complex phosphate salts. Moreover, the edible doughs of this invention are exceedingly complicated environments from a chemical point of view and provide a high level of sodium ions from sources other than the bicarbonate. Nor is it scientifically possible to explain the results underlying this invention on the basis of solubility differences alone in view of the erratic occurrence of orthophosphate crystals and the lack of any discernible correlation between variations in dough storage temperatures and other factors affecting solubility and their occurrence. Where potassium bicarbonate has been considered previously as a component of leavening systems generally, the likelihood of its contributing to bad flavor has always been prominently mentioned. Under these circumstances and in view of the concerted but ineffectual efforts of other workers in the art, it was quite surprising and unexpected to discover that substantial reduction in both the occurrence and size of orthophosphate crystals in a packaged dough composition preleavened with sodium acid pyrophosphate and baking soda could be achieved without undesirable side effects, such as off-flavor, by the replacement of as little as 5%, preferably at least about 20%, and optimally 70% or more of the baking soda, with potassium bicarbonate, all percentages being by mol.

In this formulation, the substantial reduction in the level of orthophosphate crystals is attributed to the presence of potassium ions. It is unnecessary for this purpose that the potassium ions be introduced by way of the bicarbonate. Alternatively, they may be added to the pre-leavened packaged dough composition in other forms, for example, as potassium carbonate or potassium chloride. For convenience and for best results, potassium bicarbonate as the leavening gas-releasing component of the leavening system is considered a particularly practical vehicle for overcoming the tendency toward the formation of orthophosphate crystals. Therefore, the practice of this invention will be described in terms of potassium bicarbonate; however, in each instance it will be understood that potassium ions can be introduced into the system in some other manner, either as a part of or in addition to the source of the leavening gas. If desirable under specific conditions of dough formulation, the composition can include calcium ions, derived from a minor amount of a suitable calcium salt, to adjust the rate of leavening action of the potassium bicarbonate.

The variety of bakery goods in which the present invention finds utility will be entirely obvious to one skilled in the art. These include, as previously indicated, biscuits, rolls, buns and like items, of which biscuits constitute by far the greater volume. At the present state of the art, goods of these types are ordinarily formulated for storage under refrigeration at temperatures of about 45° F. in order to avoid microbiological contamination. However, as progress is made in techniques of controlling such contamination in dough systems at room temperature, the concept of this invention will have even further application to goods so formulated. Consequently, the invention should not be construed as inherently restricted to refrigerated bakery items, or more especially, to refrigerated biscuits, although it is the latter context for which the invention concurrently has its greatest value and in which it will be described by way of exemplifying its practice.

The experienced baker will need little or no instruction in the formulation and preparation of doughs for the classes of goods just described. However, for purposes of illustrating the invention to those less skilled in the art, a generic formulation for refrigerated biscuits can have the following composition—

| Ingredients: | Percent by weight |
|---|---|
| Flour | 40–65 |
| Shortening | 3–30 |
| Dextrose | 0–8 |
| Non-fat dried milk solids | 0–8 |
| Salt | 0–2 |
| Water | 15–40 |
| Bicarbonate (on the basis of sodium bicarbonate) | 1–1.5 |
| Leavening acid (on the basis of sodium acid pyrophosphate) | 1.4–2.1 |

The formulation of specific doughs and the choice of ingredients employed therein have no particular bearing upon the present invention and it will be understood that the preceding list is not necessarily exhaustive. However, most of the ingredients commonly appearing in biscuit recipes have been included. The addition of minor amounts of other ingredients may be desirable for some specialized products and is, of course, within the broad ambit of this invention.

The type and/or grade of the several ingredients, exclusive of the leavening system, may be that customary in the industry. For example, any flour deemed acceptable for biscuit making will be satisfactory here. A hard wheat flour is often preferable, but any good all purpose flour is quite acceptable. The sweetening agent mentioned above is dextrose; however, other culinary sweeteners can be substituted such as corn syrup solids, sugar and the like. The dried milk solids serve to provide milk protein and are ordinarily fat-free, or non-fat in nature. As specific examples, mention can be made of spray-dried skim milk or spray-dried whey. Along with the salt may be included other seasonings or flavoring agents as desired.

A number of commercially available shortenings constituted by or derived from animal or vegetable fats are satisfactory in the above formulation. Best results are generally obtained with a plastic shortening, although if a liquid shortening is otherwise satisfactory, its use is not excluded. The plastic shortening can be compounded of naturally plastic fats, natural oils hardened to an appropriate consistency by hydrogenation, or blends of the two. Specifically, good performance can be achieved with any all-purpose hydrogenated plastic shortening, such as that sold under the trade name "Crisco." Other plastic or semi-plastic shortenings containing an emulsifier are currently attracting considerable attention in the bakery industry and can be used if desired. One specific example of a satisfactory emulsified shortening is a conventional hydrogenated shortening containing about 5%, by weight, of glycerine partially esterified with fatty acid, such as stearic acid. This partial ester contains about 30–40% of monoglyceride, 30–40% of diglyceride, the balance being triglyceride. Numerous other emulsifying agents are available and could be substituted with more or less equal results. The amount of the emulsifier can range from 2% up to about 15% or more, by weight, of the shortening. The amount of water selected within the stated broad range will vary with the type and grade of flour employed and will be that needed for good mixing and development of the flour and other ingredients into dough, consistent with maintenance of good handling qualities for the subsequent operation of sheeting, cutting and packaging. Frequently, about 30–40% of water will be preferable for this purpose, but in any event, it will be observed that the final dough contains a significant amount of water.

From the introduction to this specification, it will be understood that the problem underlying the invention is peculiar to the use of sodium acid pyrophosphate as the leavening acid for the dough composition. Several chemical suppliers now provide this compound in a condition and grade suitable for use herein. So long as this material is in the form of particles sufficiently fine for reasonably uniform distribution throughout the other dry ingredients, the degree of fineness does not appear to be a material factor. Advantageously, the rate of leavening reaction is very low or non-existent during mixing of the dough and subsequent handling, the period known as "bench" time, so that little or no leavening gas is evolved until the package has been filled and sealed. It is known that the rate of reaction of SAPP can be controlled by the presence of calcium ions, which it is believed, form a complex with the SAPP, delaying the reaction of the latter. These complexes are prepared by treating the SAPP with a suitable calcium-containing compound; commercial materials treated in this manner are available from various suppliers, and can be used alone or in admixture with untreated material, as may be advisable for a particular reaction rate. If additional time is indicated, as may be the case in accordance with the present invention unless the doughs are maintained at quite low temperatures, it can be obtained by incorporating an additional amount of calcium compound directly into the dough mix or in admixture of a component of the leavening system. In general, about 0.1–1% calcium compound by weight of the bicarbonate calcium will be found adequate for this purpose. Any calcium compound that is safe for food use and does not contribute to off flavors will serve as retarding agent for the leavening reaction. Calcium lactate is preferred, while tricalcium phosphate and calcium sulfate are generally satisfactory. Other calcium compounds meeting the above-mentioned criteria can be substituted, such as calcium chloride, provided its hygroscopicity does not cause processing difficulties and its flavor is acceptable.

As the gas-producing or alkaline leavening agent actually contributes the carbon-dioxide as leavening gas, the amount of this agent is normally specified as the basis for the requisite extent of ultimate leavening action. In this instance, however, by reason of the possibility of using a blend of bicarbonate salts, the extent of leavening desired is more conveniently expressed with reference to the leavening acid, it being understood that the total proportion of bicarbonate will be sufficient to at least neutralize the leavening acid and preferably provide a slight excess of bicarbonate. With this understanding in mind, the amount of leavening acid needed for effective leavening should range, in general, about 1.4–2.1% by weight of the complete dough, expressed as sodium acid pyrophosphate. Below this range, the dough will not rise sufficiently during proofing to seal the package effectively or during baking to produce the extent of lightness in the crumb desired by most consumers. At the other extreme, if this range is materially exceeded, undesirable flavor may result from the unnecessarily high level of phosphate salt. As indicated, the total amount of bicarbonate incorporated in the dough mix is sufficient to completely neutralize the sodium acid pyrophosphate and, more preferably, to provide a slight excess. To simplify the selection of specific amounts of bicarbonate, the neutralizing ratio expressed in parts by weight, with respect to sodium acid pyrophosphate of sodium acid bicarbonate is 1:.72 and of potassium bicarbonate is 1:.895. To illustrate what excess amount of bicarbonate might be provided in practice, assuming that potassium bicarbonate was employed alone, a suitable weight ratio would be 1:.86.

It is not essential to the present invention that all of the sodium bicarbonate be replaced by potassium bicarbonate; indeed, in view of the prevailing cost advantage in favor of sodium bicarbonate, retention of a considerable proportion of the less expensive sodium salt would be economically advantageous. Actual evidence will be provided hereinafter to demonstrate that the replacement of as little as 5% of the sodium salt with the potassium salt results in a significant reduction in the formation of orthophosphate crystals. Below this value, the extent of the reduction falls off very rapidly. Even better results can be obtained when the potassium bicarbonate constitutes at least about 20 mol percent of the total bicarbonate present, while for maximum reduction in crystal occurrence, at least about 70% molar replacement is recommended. The difference between 70% and complete molar replacement is of negligible-to-minor order. As in the case of the SAPP, the particle size of the bicarbonate salt or salts is not critical provided that the fineness thereof is consistent with easy mixing and homogeneous distribution.

The substitution of the sodium bicarbonate with potassium bicarbonate does not create any complications in the standard dough mixing and packaging techniques and no changes in standard practice are necessitated solely by the present invention. Customarily, two mixing stages have been utilized, the first wherein the major dry ingredients are blended, and then admixed with water for the bulk of the time needed for dough development, and the second wherein the minor ingredients, usually premixed in advance, are added and mixing continued to the desired end point. The premix for the second stage includes salt and ordinarily the bicarbonate as well, and this practice is preferably adopted in the present invention. In this way, premature initiation of the leavening reaction is avoided. If desired, both leavening agents can be incorporated by way of the second stage treatment. First stage mixing can be carried out in any commercial dry mixer, such as a Hobart paddle mixer, or alternatively, directly in the dough mixer. In the latter case, a sigma blade kneader or dough mixer is particularly suitable. The shortening is desirably withheld from the first stage until the remaining major dry ingredients have been blended together. The shortening can then be added and mixing continued until the shortening forms tiny pebbles or balls, indicating that an almost homogeneous mixture, i.e. a grossly uniform mix, has been achieved. Simultaneous mixing of the shortening and major dry ingredients can be practiced, provided a somewhat less uniform mixture is not objectionable. If not already in a dough mixer, the mixture is then transferred to such a unit and at this point, substantially all of the recipe water or other aqueous liquid is added and the mixer is operated until the dough has reached a slightly-to-moderately developed condition. Thereafter, the second stage premix is added and the mixing continued until the premix ingredients are uniformly dispersed within the dough. Preferably, the dough is maintained at a reasonably low temperature during its formation and development. To this end, the mixer can be equipped with a jacketed bowl connected to a convenient source of coolant, such as water chilled to about 35° F. Further cooling can be effected by chilling to a similar low temperature either or both of the recipe liquid and the major dry ingredients.

After mixing and development, the dough is ready for sheeting, cutting, and packaging. In sheeting, the dough mass is rolled into a flat, thin layer often with two or more separate rolling operations. The sheeted dough is then cut into biscuit-size pieces of the desired dimension and configuration, preferably leaving a clearance of about one-sixteenth inch with the inside package diameter to facilitate filling. 25 gram pieces cut with a 1⅞ inch hexagonal cutter are quite satisfactory for this type of carton or packages currently in widespread use. These cartons have a capacity of ten pieces, although the precise number is obviously not critical, and are formed of a fiberboard tube, having inner and outer metallic foil liners, which is closed at the ends by sheet metal panels clamped or crimped into place. Although these cartons are not airtight, a good seal is nevertheless achieved during the course of proofing, next to be described.

When the cartons have been loaded and the end panels attached, they are proofed at room temperature (75–80° F.) for a period of time ranging from about one-half to several hours and until the pieces rise sufficiently to completely fill the carton and expel residual air. In this way, the dough pieces, in effect, provide their own seal, preventing the loss of leavening gas therefrom. Once proofed, the cartons are ready for distribution and sale.

Illustration of the seriousness of the problem of orthophosphate crystal formation resulting from the use of sodium bicarbonate in combination with SAPP as well as the alleviation of that problem in accordance with the present invention, is considerably complicated by the highly variable and unpredictable nature of this phenomenon. For example, in groups of samples taken from batches prepared in the same plant with the same equipment, under as close to identical conditions as possible, the results obtained varied widely not only as to the size and extent of crystals formed but their location within the carton as well. This diversity can be demonstrated by the following tabulation of the results of examining sample cartons taken from consecutive pilot plant runs, all using sodium bicarbonate exclusively, after a normal storage period.

TABLE I

*Occurrence of crystals in samples from consecutive control runs*

| Run No. | No. Biscuits Examined | No. Biscuits Containing Crystals | Percent Biscuits Containing Crystals |
|---|---|---|---|
| 1 | 90 | 47 | 52 |
| 2 | 60 | 11 | 18 |
| 3 | 90 | 29 | 32 |
| 4 | 70 | 66 | 94 |
| 5 | 60 | 39 | 65 |
| 6 | 30 | 23 | 77 |
| 7 | 30 | 1 | 3 |
| 8 | 120 | 8 | 7 |

With a view to providing a broad basis for sampling that would fairly represent the degree of improvement that could be realistically anticipated in accordance with the invention, a series of pilot plant runs at varying levels of bicarbonate replacement were carried out along with a series of full plant test runs arranged at closer intervals over the range of replacement, the latter being supplemented by a final control plant run. The composition and procedure used during the pilot plant run are described in detail in the following example, and the plant runs were set up to duplicate the pilot operations as closely as possible, consistent with the difference between laboratory and plant operation. Samples of the cartons were taken at random from these runs in the number hereinafter indicated and were stored at 40° F. for the periods specified. After such storage, the cartons were opened and each biscuit piece in each carton was thoroughly examined for the presence of crystals by experienced observers. In order for the results to take into account the greater perceptivity of these observers compared to the average consumer, the cans were placed into three categories according to the following criteria: (1) cans having no detectable crystals whatever were characterized as "no crystals"; (2) cans containing either five or less biscuits with crystals not greater than 1/16 inch maximum dimension, or no more than two biscuits with crystals having 1/16–1/8 inch maximum dimension and no biscuits with crystals exceeding 1/8 inch maximum dimension were characterized as "crystals detectable, but not obvious," indicating that these would either go unnoticed or be unobjectionable to the average consumer; and (3) cans containing either more than five biscuits with crystals not greater than 1/16 inch maximum dimension, more than two biscuits having crystals of 1/16–1/8 inch maximum dimension, or any biscuits with crystals greater than 1/8 inch maximum dimension were characterized as "obvious crystals."

EXAMPLE I

The dough of this example contains the following ingredients in the following proportions—

| Ingredient: | Grams |
|---|---|
| Flour | 3735 |
| Shortening | 373 |
| Calcium-treated sodium acid pyrophosphate (Type RD–1) | 55 |
| Sodium acid pyrophosphate (Type 26) | 55 |
| Dextrose | 68 |
| Dried whey solids | 87 |
| Water cc | 2176 |
| Salt | 78 |
| Bicarbonate (on the basis of sodium bicarbonate) | 87 |

The above enumerated ingredients, exclusive of salt, bicarbonate, shortening and water are introduced into a 20-quart, stainless steel water-jacketed mixing bowl of a Triumph bench-type mixer (Model N–20) and mixed for two minutes at 100 r.p.m. with a beater blade known as a 4-wing whip. The shortening is heated to about 120–130° C. until melted, added to the mixing bowl and mixing is continued for an additional five minutes. After addition of the shortening, water chilled to about 35° F. is passed through the water jacket of the mixing bowl. At the end of the five minute period, the shortening appears in the mix as tiny pebbles or balls and the ingredients are in an almost homogeneous condition. The mixer is stopped and its dry mixing blade is replaced with a dough-kneading blade, known as a dough hook. Approximately 97% of the water (about 2120 cc.) chilled to about 32° F. is then introduced into the mixing bowl and the mixer operated for about 8 minutes at 175 r.p.m. At the end of this time, the ingredients are in the form of a moderately developed dough and the mixing is stopped to permit introduction of the salt, bicarbonate and remaining ice water. It is then reinitiated and continued for four minutes at 175 r.p.m., uniformly distributing the newly-added ingredients to the dough mass. The finished dough temperature is about 60° F.

The dough is then removed from the mixing bowl, dusted with wheat flour, and sheeted by passage between rolls. The resultant sheet is dusted with rice flour, cut into biscuits with a 1¾ inch hexagonal cutter, brushed with shortening, packed into a conventional tube package and the end panels clamped in place. The closed tubes are proofed for an average of about 25 minutes at room temperature and until palpably firm. Then they are placed in a refrigerator maintained at about 35° F. overnight, removed, and stored at 40° F. After storage for a period of time as specified, the tubes are opened and carefully examined for the presence of orthophosphate crystals in the manner previously indicated.

For the series of runs at varying proportions of sodium and potassium bicarbonate, the specified mol percent of the sodium bicarbonate was replaced with potassium bicarbonate containing calcium lactate in the amount of 0.5% of its weight.

The results of the examination of the sample tubes are summarized in the following Table II.

TABLE II

*Summary of results of examination for crystals in biscuits leavened with varying amounts of sodium and potassium bicarbonate*

A. Pilot Plant Runs (78 days storage):

| Mol Percent Bicarbonate as— | | Total Tubes Examined | Occurrence of Crystals (No. Tubes) | | |
|---|---|---|---|---|---|
| Na | K | | None | Detectable | Obvious |
| 0 | 100 | 9 | 8 | 1 | 0 |
| 40 | 60 | 13 | 13 | 0 | 0 |
| 60 | 40 | 13 | 10 | 2 | 1 |
| 80 | 20 | 13 | 7 | 5 | 1 |
| 100 | 00 | 14 | 8 | 6 | 0 |

B. Plant Runs (63 days storage):

| Mol Percent Bicarbonate as— | | Total Tubes Examined | Occurrence of Crystals (No. Tubes) | | |
|---|---|---|---|---|---|
| Na | K | | None | Detectable | Obvious |
| 0 | 100 | 30 | 27 | 3 | 0 |
| 10 | 90 | 10 | 10 | 0 | 0 |
| 20 | 80 | 10 | 10 | 0 | 0 |
| 25 | 75 | 10 | 10 | 0 | 0 |
| 30 | 70 | 10 | 9 | 1 | 0 |
| 40 | 60 | 10 | 10 | 0 | 0 |
| 100 | 0 | 30 | 0 | 28 | 2 |
| 100 | 0 | ¹13 | 0 | 1 | 12 |

¹ Repeat—67 days storage.

In order to reveal visually the correlation between the level of potassium bicarbonate and decreasing occurrence of orthophosphate crystals, the accompanying drawing is a composite of the results tabulated above. This chart was prepared by locating on the graph the percentage of total tubes examined falling into each of the three categories defined above for each of the runs at the several levels of bicarbonate content and then drawing a curve for each of these categories as best fits the points so located. The curves cannot be considered precise due to scattering of the data but they are as representative as possible under the circumstances. It will be seen that the curve representing the tubes containing "no crystals" increases sharply up to about 5% molar replacement level, then less sharply between 5–20%, continues to fall off between 20% and 70% and after 70% essentially levels off.

Contrary to the decided negative concensus of the baking industry generally as to the usefulness of potassium bicarbonate as an alkaline leavening agent, principally on the grounds of bitter flavor, the substitution of potassium bicarbonate for sodium bicarbonate in accordance with the present invention, even at the 100% level, has not been found to contribute objectionably to the flavor of the final product. This fact is best revealed by the results of duo-trio flavor panel tests conducted with laboratory employees having, in all probability, a higher discrimination than the average consumer. Two samples were tested against controls using only sodium bicarbonate:

(1) Where the sodium bicarbonate was entirely replaced with potassium carbonate containing 1% calcium lactate of its weight, and (2) Where 95% molar replacement with potassium bicarbonate was used, the potassium bicarbonate containing .5% calcium lactate of its weight. The samples used in the two tests were aged twelve days and five days, respectively. Of the panelists able to discriminate correctly between test samples and controls, as many objected to the flavor of the control samples as to the flavor of the test samples. In view of these results, the presence of potassium bicarbonate was obviously not considered to be a source of objectionable flavor.

In other respects, the formulation of articles from doughs embodying the present invention have been found to involve no operational difficulties and the quality of the resultant products are entirely satisfactory as to volume, crumb, and other significant properties.

Having thus described my invention, that which is claimed is:

In a preleavened packaged dough composition comprising flour, water and leavening comprised of from about 1.4 percent to about 2.1 percent by weight of the dough of sodium acid pyrophosphate and a blend of sodium and potassium bicarbonate salts sufficient to at least substantially neutralize said pyrophosphate, the improvement wherein said blend of sodium and potassium bicarbonate salts contains from about 20 mol percent to about 70 mol percent potassium salt, whereby said preleavened packaged dough exhibits during storage a substantial reduction in both the occurrence and size of orthophosphate crystals.

References Cited by the Examiner

UNITED STATES PATENTS

| | | | |
|---|---|---|---|
| 2,478,618 | 8/1949 | Armstrong et al. | 99—95 |
| 2,793,121 | 5/1957 | Novitsky | 99—95 |
| 2,942,988 | 6/1960 | Erekson et al. | 99—95 X |
| 3,034,899 | 5/1962 | Tucker | 99—95 |
| 3,142,573 | 7/1964 | Erekson et al. | 99—95 |

FOREIGN PATENTS 550,539   1/1943   Great Britain.

RAYMOND N. JONES, *Primary Examiner.*

A. LOUIS MONACELL, J. GOLIAN,
*Assistant Examiners.*